F. NEARING.
AUTOMOBILE DUMPING TRUCK.
APPLICATION FILED MAR. 12, 1918.

1,283,867.

Patented Nov. 5, 1918.

WITNESSES
H. C. Bostwick
John J. Duffy

INVENTOR
Frank Nearing
BY
ATTORNEY

UNITED STATES PATENT OFFICE.

FRANK NEARING, OF NEW YORK, N. Y.

AUTOMOBILE DUMPING-TRUCK.

1,283,867.                Specification of Letters Patent.      Patented Nov. 5, 1918.

Application filed March 12, 1918. Serial No. 222,011.

*To all whom it may concern:*

Be it known that I, FRANK NEARING, a citizen of the United States, residing at 62 W. 93rd street, in the borough of Manhattan, city, county, and State of New York, have invented a new and useful Automobile Dumping-Truck, of which the following is a specification.

And the objects of my invention are:

A dumping mechanism requiring a minimum amount of energy for its operation and facility for redumping readily if desired.

The ability to regulate the drop in dumping through the band brake on one drum shaft.

The necessary jar to shake the loaded material loose.

The ability to use the engine for hoisting or drumpulling for loading or unloading heavy or bulky articles by disconnecting the ropes from standards and box, and connecting the said ropes to the object to be pulled by use of easily connected shackles.

The angular extension of the friction lever, effected through the channeled disk bearing.

The automatic opening and closing of the end gates by the rods connecting the rear standards to the said end gates.

Simplicity of construction and easy access to the different parts for repair or renewal.

I attain these objects by the mechanism illustrated in the accompanying drawings.

Similar letters refer to similar parts throughout the drawings and descriptions.

Figure 1:
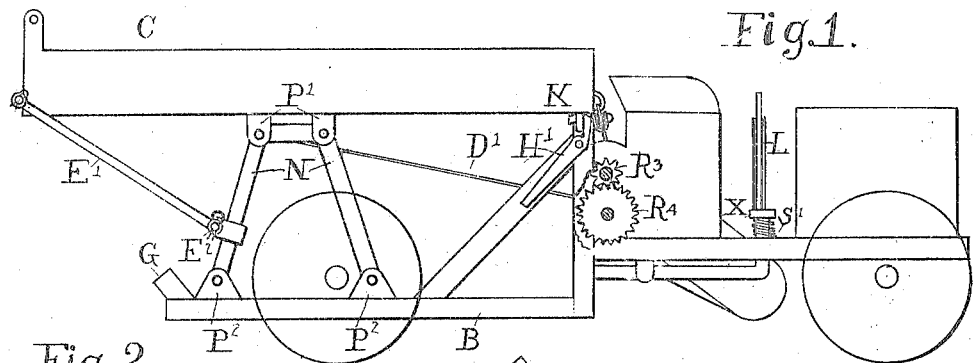
Figure 1 is a side view of the truck in the position for loading. A portion of the upright frame is omitted to show the drum gears.
Figure 2:
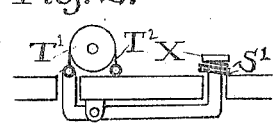
Fig. 2 shows the brake disk with band and connections.
Figure 3:
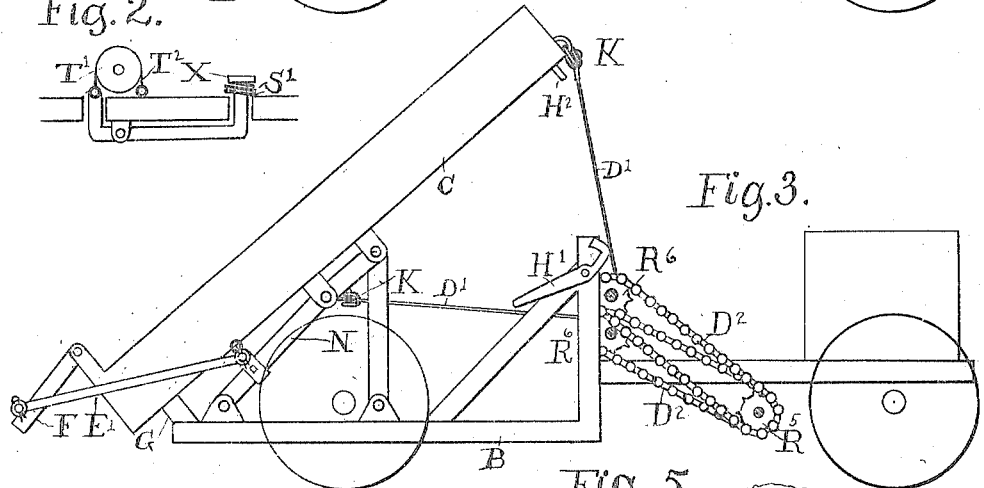
Fig. 3 is a side view of the truck in the position for dumping, showing the sprocket chains connecting the drums exposed with gears, brake and lever omitted.
Figures 4, 5, 6:
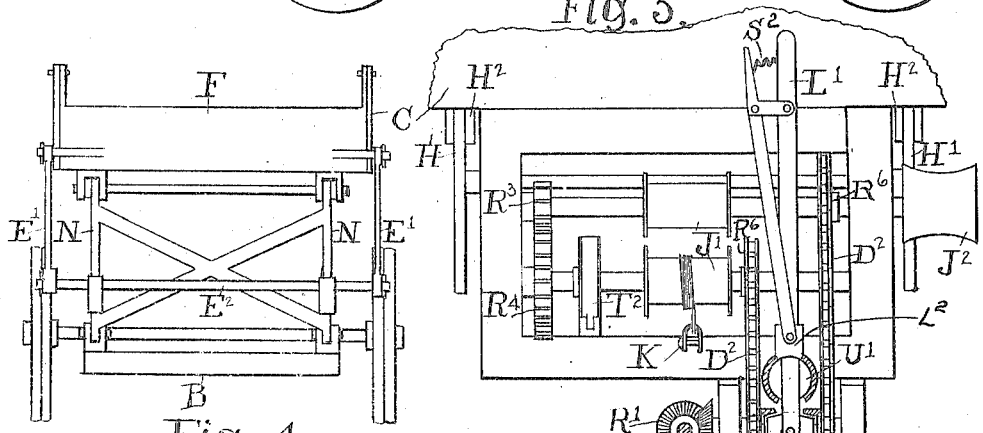
Fig. 4 is a rear view showing the braces for the standards.
Fig. 5 is a front view of the operating mechanism stripped, with the disk bearing exposed and the female portions of the friction clutches in section.
Fig. 6 is a horizontal section across the lever disk bearing, showing the disk casing section of disk and lever slot.

B is the frame carrying the standard bearings, $P^2$, $P^2$, and all the other parts, and is shown as a dropped frame.

N N are the standards supporting the box and connected thereto by the bearings $P^1$, $P^1$.

C is the box for carrying the load.

$D^1$, $D^1$ are the ropes connected to rings on the rear standards and box by the shackles K, K, the said ropes being wound on the drums $J^1$, $J^1$ for dumping and resetting the said box.

$J^2$ is a winch head on the outer end of one drum shaft.

$R^6$, $R^6$ are sprocket wheels fixed on the shafts of the said drums, which shafts are geared together by gears $R^3$ and $R^4$, and carried in bearings on the upright portion of the frame B. The said sprocket wheels $R^6$, $R^6$ are connected by chains $D^2$, $D^2$ to the sprocket wheels $R^5$, $R^5$ loosely mounted on the transverse shaft $A^2$. Upon a square section of this transverse shaft is also loosely mounted a spindle, I, consisting of two out pointing truncated cones including a cylindrical portion. The said cones face corresponding recesses in the hubs of the sprocket wheels $R^5$ so that either end of the said spindle I and the facing recess forms a friction clutch and fixes the engaged sprocket wheel to the said transverse shaft $A^2$ upon which is fixed the bevel gear $R^2$ which engages the similar gear $R^1$ on the main shaft $A^1$.

The spindle I has upon its cylindrical portion a groove within which groove and encircling the said spindle is a ring having studs set upon its opposite sides which studs engage forks on the lower end of a lever $L^1$, which is supported by a channeled disk $U^1$, which disk is loosely mounted in its bearing $U^2$, which is cut away to permit the action of the lever $L^1$ in throwing the spindle I into connection with either sprocket wheel.

The lever $L^1$ is held in a neutral position by the collar $L^2$ until released by pressing the handle against the spring $S^2$ and raising the collar from between the segments of the disk casing $U^2$.

F is the end gate which is opened and closed by the rods $E^1$ which extend from studs on the back of the gate to a bar $E^2$, which is clamped across the rear standards.

G, G are spring buffers which take the shock of the box C when dumped.

$H^1$ $H^1$ are latches fixed on a rod across the upright frame and engage strong staples, $H^2$, $H^2$, on the bottom of the box to hold the box securely against dumping until the said latches are released.

In dumping the latches are released; the lever thrown to engage the sprocket wheel connected to the lower drum, drawing the standards forward until the center of gravity of the box and load pass the point of support; the lever is then thrown neutral releasing the dumping clutch and the dumping regulated with the drum brake.

After the dumping is finished, the clutch is thrown by the lever to engage the sprocket wheel connected to the upper drum, drawing the box back to the horizontal position, the latches are thrown in and the lever returned to the neutral position and the truck is ready to go for another load.

To use the truck as a hoisting or winding engine, the shackles must be disconnected and either of the drums on the winch head may be used.

Having thus described my invention, I hereby claim the following improvements in dumping trucks:

1. In a dumping truck, a frame, a body-front standards pivotally connecting the body with the frame, rear standards pivotally connecting the body with the frame and means for pulling forwardly on the upper ends of the rear standards to incline the body.

2. In a dumping truck, a frame, a body, front standards pivotally connecting the body with the frame, rear standards pivotally connecting the body with the frame, drums geared together and connected respectively by ropes to the rear standards and front end of body, right angle gears connecting to the driving shaft, a cross shaft carrying two loose sprocket wheels provided with friction recesses on either side of friction cones which are mounted on a square section of the said cross shaft, sprocket chains connecting the aforesaid sprocket wheels to sprocket wheels fixed on the shafts of the said drums for the operation of the said drums when either of the friction cones mentioned is engaged to the opposing one of the first said sprocket wheels.

3. In a dumping truck, a frame, a body, standards pivoted to the body and the frame, means for controlling the body including a cross shaft carrying friction cones, a lever, a channeled disk for the lever, a bearing for the disk, a recess in the bearing, a sliding collar on the lever to engage the recess to lock the lever, and means for moving the sliding collar.

4. In a dumping truck, a frame, a body, front standards pivotally connecting the body with the frame, rear standards pivotally connecting the body with the frame, a drum and cable for pulling forwardly on the upper ends of the standards to tilt the body and a second drum and cable connected to the front end of the body to restore the body to horizontal position.

5. In a dumping truck, a frame, a body, front and rear standards pivoted to the body and to the frame, a gate pivoted at its top to the body, studs on the sides of the gate, a bar clamped across the rear standards and rods pivoted to the bar and swiveled on the studs, all substantially as shown and described in the accompanying drawings and specifications.

FRANK NEARING.

Witnesses:
JOHN J. DUFFY,
H. C. BOSTWICK.